United States Patent
Fujiwara et al.

(10) Patent No.: US 11,827,004 B2
(45) Date of Patent: Nov. 28, 2023

(54) METHOD AND DEVICE FOR PRODUCING FOAMED BODY

(71) Applicant: RICOH COMPANY, LTD., Tokyo (JP)

(72) Inventors: Yukio Fujiwara, Kanagawa (JP); Yuuma Usui, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 458 days.

(21) Appl. No.: 17/188,989

(22) Filed: Mar. 1, 2021

(65) Prior Publication Data
US 2021/0292509 A1 Sep. 23, 2021

(30) Foreign Application Priority Data
Mar. 23, 2020 (JP) ................. 2020-050450

(51) Int. Cl.
*B32B 5/20* (2006.01)
*B41J 2/01* (2006.01)
(Continued)

(52) U.S. Cl.
CPC ............... *B32B 5/20* (2013.01); *B41F 31/28* (2013.01); *B41J 2/01* (2013.01); *B41M 5/5227* (2013.01);
(Continued)

(58) Field of Classification Search
CPC ..... C08J 9/228; C08J 9/224; C08J 9/32; C08J 2203/22; B41J 2/01; B41M 5/5227;
(Continued)

(56) References Cited

U.S. PATENT DOCUMENTS

| | | | | |
|---|---|---|---|---|
| 4,068,030 A | * | 1/1978 | Witman | .................. D06N 3/06 427/210 |
| 5,122,430 A | * | 6/1992 | Nishitsuji | .............. G03G 9/097 430/108.6 |

(Continued)

FOREIGN PATENT DOCUMENTS

| | | |
|---|---|---|
| JP | 10-076587 | 3/1998 |
| JP | 2007-308869 | 11/2007 |

(Continued)

OTHER PUBLICATIONS

Machine Translation of IL 36971 by Cohn. (Year: 1975).*
European Search Report dated Aug. 31, 2021 in Application No. 21160561.3. 5 pages.

*Primary Examiner* — Michael M Dollinger
*Assistant Examiner* — Christina H. W. Rosebach
(74) *Attorney, Agent, or Firm* — Grüneberg and Myers, PLLC (57) ABSTRACT

A method for producing a foamed body includes: forming a foamed layer precursor including applying a coating liquid onto a base to form a liquid film and applying an ink onto the liquid film by an inkjet method, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group; and foaming a desired position of the foamed layer precursor by heating to form a foamed layer. A functional group equivalent of the radical-polymerizable functional group in the foaming accelerator is greater than a functional group equivalent of the radical-polymerizable functional group in the active energy ray curable material.

4 Claims, 1 Drawing Sheet

(51) Int. Cl.
  *B41M 5/52* (2006.01)
  *C08J 9/224* (2006.01)
  *C09D 11/037* (2014.01)
  *C09D 11/101* (2014.01)
  *C09D 11/36* (2014.01)
  *C08J 9/32* (2006.01)
  *D06N 7/00* (2006.01)
  *B41M 7/00* (2006.01)
  *B41F 31/28* (2006.01)
  *B41M 5/28* (2006.01)

(52) U.S. Cl.
  CPC .......... *B41M 5/5254* (2013.01); *B41M 7/009* (2013.01); *C08J 9/224* (2013.01); *C08J 9/32* (2013.01); *C09D 11/037* (2013.01); *C09D 11/101* (2013.01); *C09D 11/36* (2013.01); *D06N 7/0018* (2013.01); *B41M 5/287* (2013.01); *C08J 2203/22* (2013.01)

(58) Field of Classification Search
  CPC .. B41M 5/5254; B41M 5/0017; B41M 5/287; B41M 7/0081–009; C09D 11/037; C09D 11/101; C09D 11/36; B32B 5/20; D06N 7/0018
  See application file for complete search history.

(56) References Cited

U.S. PATENT DOCUMENTS

2017/0137641 A1  5/2017  Saito et al.
2018/0320320 A1  11/2018  Moriya et al.
2020/0325689 A1* 10/2020  Li .................... E04F 15/105

FOREIGN PATENT DOCUMENTS

| JP | 2012-087451 | 5/2012 |
| JP | 2017-105162 | 6/2017 |
| JP | 2019-155702 | 9/2019 |

* cited by examiner

METHOD AND DEVICE FOR PRODUCING FOAMED BODY

CROSS-REFERENCE TO RELATED APPLICATIONS

This patent application is based on and claims priority pursuant to 35 U.S.C. § 119(a) to Japanese Patent Application No. 2020-050450, filed on Mar. 23, 2020, in the Japan Patent Office, the entire disclosure of which is hereby incorporated by reference herein.

BACKGROUND

Technical Field

The present disclosure relates to a method for producing a foamed body and a device for producing a foamed body.

Description of the Related Art

Floors, inner walls, ceilings, and other parts of buildings use members such as flooring and wallpaper to which desired images are printed and designs are imparted by, for example, embossing. Further, attempts are being made to improve durability of flooring and wallpaper by applying coatings of ultraviolet (UV) curable materials and coatings of electron beam-curable materials.

In recent years, techniques for inkjet-printing desired images on, for example, embossed flooring and wallpaper have been being developed. A technique proposed as such a technique is a method for producing foamed wallpaper including a foamable layer, an image forming layer, and a surface protecting layer, where the foamable layer contains a thermoplastic resin and a foaming agent, and the image forming layer and the surface protecting layer are crosslinkable or curable by electron beam irradiation.

As a technique for embossing, for example, proposed is a technique of providing a foamed sheet by chemical embossing, the foamed sheet including a foamed resin layer formed of an aqueous paint for foaming, a print ink layer having a portion printed with a foaming-suppressing ink, and an ultraviolet curable layer.

Further, proposed is a technique that an ink layer is formed on a foamable medium with an electromagnetic wave-absorbable ink, which absorbs electromagnetic waves to generate heat, so that the ink layer is formed in a portion of the foamable medium where formation of a three-dimensional structure is desired, and then color printing for image formation is performed on the ink layer, followed by irradiation with electromagnetic waves for foaming expansion.

SUMMARY

According to one aspect of the present disclosure, a method for producing a foamed body includes: forming a foamed layer precursor including applying a coating liquid onto a base to form a liquid film and applying an ink onto the liquid film by an inkjet method, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group; and foaming a desired position of the foamed layer precursor by heating to form a foamed layer. A functional group equivalent of the radical-polymerizable functional group in the foaming accelerator is greater than a functional group equivalent of the radical-polymerizable functional group in the active energy ray curable material.

BRIEF DESCRIPTION OF THE DRAWING

A more complete appreciation of the disclosure and many of the attendant advantages and features thereof can be readily obtained and understood from the following detailed description with reference to the accompanying drawing, wherein the drawing is a schematic view illustrating one example of a device of the present disclosure for producing a foamed body used in a method of the present disclosure for producing a foamed body.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to the present disclosure, it is possible to provide a method for producing a foamed body having a design property attributable to an excellent bossed-recessed shape and excellent durability.

(Method and Device for Producing Foamed Body)

In one embodiment of the present disclosure, a method for producing a foamed body includes: a foamed layer precursor forming step of applying a coating liquid onto a base to form a liquid film and applying an ink onto the liquid film by an inkjet method to form a foamed layer precursor, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group; and a foamed layer forming step of foaming a desired position of the foamed layer precursor by heating to form a foamed layer. A functional group equivalent of the radical-polymerizable functional group in the foaming accelerator is greater than a functional group equivalent of the radical-polymerizable functional group in the active energy ray curable material. If necessary, the method further includes other steps.

In one embodiment of the present disclosure, a method for producing a foamed body includes: a foamed layer precursor forming step of applying a coating liquid onto a base to form a liquid film, applying an ink onto the liquid film by an inkjet method, and curing the liquid film and the ink with active energy rays to form a foamed layer precursor, where the coating liquid contains a foaming agent and a multifunctional active energy ray curable material having two or more radical-polymerizable functional groups, and the ink contains a monofunctional foaming accelerator having one radical-polymerizable functional group; an image forming step of applying another ink onto the foamed layer precursor to form an ink layer and curing the ink layer with active energy rays to form an image, where said another ink contains an active energy ray curable material and a colorant; and a foamed layer forming step of foaming a desired position of the foamed layer precursor by heating to form a foamed layer. If necessary, the method further includes other steps.

In one embodiment of the present disclosure, a device for producing a foamed body includes: a foamed layer precursor forming unit containing a coating liquid and an ink, where the coating liquid contains a foaming agent and an active energy ray curable material having a radical-polymerizable functional group, the active energy ray curable material contains a multifunctional active energy ray curable material having two or more radical-polymerizable functional groups, the ink contains a foaming accelerator having a radical-polymerizable functional group, and the foamed layer precursor forming unit is configured to apply the coating liquid onto a base to form a liquid film and apply the ink onto the liquid film by an inkjet method to form a foamed layer precursor; and a foamed layer forming unit configured to foam a desired position of the foamed layer precursor by heating to form a foamed layer. A functional group equivalent of the radical-polymerizable functional group in the foaming accelerator is greater than a functional group equivalent of the radical-polymerizable functional group in the active energy ray curable material. If necessary, the device further includes other units.

In one embodiment of the present disclosure, a device for producing a foamed body includes: a foamed layer precursor forming unit containing a coating liquid and an ink, where the coating liquid contains a foaming agent and a multifunctional active energy ray curable material having two or more radical-polymerizable functional groups, the ink contains a monofunctional foaming accelerator having one radical-polymerizable functional group, and the foamed layer precursor forming unit is configured to apply the coating liquid onto a base to form a liquid film, apply the ink onto the liquid film by an inkjet method, and cure the liquid film and the ink with active energy rays to form a foamed layer precursor; an image forming unit containing another ink containing an active energy ray curable material and a colorant, where the image forming unit is configured to apply said another ink onto the foamed layer precursor to form an ink layer and cure the ink layer with active energy rays to form an image; and a foamed layer forming unit configured to foam a desired position of the foamed layer precursor by heating to form a foamed layer. If necessary, the device further includes other units.

The method of the present disclosure for producing a foamed body can be suitably performed by the device of the present disclosure for producing a foamed body. The foamed layer precursor forming step can be performed by the foamed layer precursor forming unit. The image forming step can be performed by the image forming unit. The foamed layer forming step can be performed by the foamed layer forming unit. The other steps can be performed by the other units.

The present inventors conducted intensive studies on a method for producing a foamed body having a design property attributable to an excellent bossed-recessed shape and excellent durability, and have conceived the present disclosure. That is, the present inventors have found that a foamed body having a design property attributable to an excellent bossed-recessed shape and excellent durability can be obtained by a method for producing a foamed body including: a foamed layer precursor forming step of applying a coating liquid onto a base to form a liquid film and applying an ink onto the liquid film by an inkjet method to form a foamed layer precursor, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group; and a foamed layer forming step of foaming a desired position of the foamed layer precursor by heating to form a foamed layer, wherein a functional group equivalent of the radical-polymerizable functional group in the foaming accelerator is greater than a functional group equivalent of the radical-polymerizable functional group in the active energy ray curable material.

Here, explanation will be made about a reason why the method and device of the present disclosure for producing a foamed body can form bosses and recesses to impart a design.

Specifically, an on/off control of bosses and recesses can be performed by applying a coating liquid onto a base to form a liquid film and applying an ink onto any part of the liquid film by an inkjet method, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group. In one embodiment, a functional group equivalent of the radical-polymerizable functional group in the foaming accelerator is set to be greater than a functional group equivalent of the radical-polymerizable functional group in the active energy ray curable material. In one embodiment, the foaming accelerator contains a monofunctional foaming accelerator (monofunctional monomer) having one radical-polymerizable functional group.

The multifunctional active energy ray curable material has two or more radical-polymerizable functional groups and three-dimensionally crosslinks by the application of energy. Meanwhile, the monofunctional monomer contained in the foaming accelerator weakens this three-dimensional crosslinkability and accelerates foaming by the foaming agent. This makes it possible to control on/off of foaming to provide a foamed body with a design property attributable to an excellent bossed-recessed shape.

As used herein, the acceleration of foaming means that foaming is relatively accelerated because the monofunctional monomer has weaker three-dimensional crosslinkability than the multifunctional active energy ray curable material.

A reason why a shape having level differences of bosses and recesses can be imparted to a foamed layer having a small film thickness is because of using a thermally expansible microcapsule having a high coefficient of expansion (high-extent foamability) in a foamable layer and patterning the foaming accelerator containing the monofunctional monomer by the inkjet method to be able to impart high level differences of bosses and recesses through high-extent foaming in the small film thickness.

A reason why the foamed layer has robustness is because of using the active energy ray curable material curable by the application of active energy rays in a foamable layer in the present disclosure to be able to achieve improved robustness such as high durability and solvent resistance.

<Foamed Layer Precursor Forming Step and Foamed Layer Forming Step>

The foamed layer precursor forming step is a step of applying a coating liquid onto a base to form a liquid film and applying an ink onto the liquid film by an inkjet method to form a foamed layer precursor, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group.

The foamed layer precursor forming unit is a unit configured to apply a coating liquid onto a base to form a liquid film and apply an ink onto the liquid film by an inkjet method to form a foamed layer precursor, where the coating liquid contains a foaming agent and an active energy ray curable material having a radical-polymerizable functional group, the active energy ray curable material contains a multifunctional active energy ray curable material having two or more radical-polymerizable functional groups, and the ink contains a foaming accelerator having a radical-polymerizable functional group.

In one embodiment, a functional group equivalent of the radical-polymerizable functional group in the foaming accelerator is set to be greater than a functional group equivalent of the radical-polymerizable functional group in the active energy ray curable material. In one embodiment, the foaming accelerator contains a monofunctional foaming accelerator (monofunctional monomer) having one radical-polymerizable functional group.

The coating liquid containing a foaming agent and an active energy ray curable material having a radical-polymerizable functional group, the active energy ray curable material containing a multifunctional active energy ray curable material having two or more radical-polymerizable functional groups, is applied onto the base.

<<Base>>

The base is not particularly limited and may be appropriately selected depending on the intended purpose. Examples of the base include, but are not limited to, sheets such as plastic films, synthetic paper sheets formed of synthetic fibers, and nonwoven fabric, and building materials. Among these bases, durable bases are preferable, and building materials are more preferable.

Examples of the plastic films include, but are not limited to: polyester films; polypropylene films; polyethylene films; plastic films of nylon, vinylon, and acrylic; and films formed of these films pasted together.

The plastic films are not particularly limited and may be appropriately selected depending on the intended purpose. It is, however, preferable to uniaxially or biaxially stretch the plastic films in terms of strength.

The nonwoven fabric is not particularly limited and may be appropriately selected depending on the intended purpose. Examples of the nonwoven fabric include, but are not limited to, nonwoven fabric formed of polyethylene fibers sprinkled into a sheet and thermocompression-bonded with each other to obtain a sheet.

The building materials are not particularly limited and may be appropriately selected depending on the intended purpose. Examples of the building materials include, but are not limited to, thermosetting resins, fiberboards, and particle boards used for flooring, wallpaper, interior materials, wallplate materials, baseboard materials, ceiling materials, and pillars, and these materials having decorative laminates of, for example, thermosetting resins, olefin, polyester, and PVC on the surfaces.

<<Coating Liquid>>

The coating liquid contains a foaming agent and an active energy ray curable material having a radical-polymerizable functional group, the active energy ray curable material containing a multifunctional active energy ray curable material having two or more radical-polymerizable functional groups. If necessary, the coating liquid preferably contains a polymerization initiator. If necessary, the coating liquid further contains other components.

—Foaming Agent—

The foaming agent used is a thermally expansible microcapsule or a thermally degradable volume-expanding agent. Among them, a thermally expansible microcapsule is preferable because the thermally expansible microcapsule has a high coefficient of volume expansion and can form uniform, small independent cells.

The thermally expansible microcapsule is a particle having a core-shell structure that encapsulates a foaming agent with a thermoplastic resin. In response to heating, the thermoplastic resin that constitutes the shell starts to soften, the vapor pressure of the encapsulated foamable compound rises to a pressure enough to deform the particle, and the thermoplastic resin constituting the shell is drawn to expand. Examples of the foamable compound include, but are not limited to, an aliphatic hydrocarbon having a low boiling point.

Commercially available products can be used as the thermally expansible microcapsule. Examples of the commercially available products include, but are not limited to, ADVANCELL EM SERIES available from Sekisui Chemical Co., Ltd., EXPANCELL DU, WU, MB, SL, and FG SERIES available from Akzo Novel N.V. (sold by Japan Fillite Co., Ltd. in Japan), MATSUMOTO MICROSPHERE F and FN SERIES available from Matsumoto Yushi-Seiyaku Co., Ltd., and KUREHA MICROSPHERE H750, H850, and H1100 available from Kureha Corporation. One of these commercially available products may be used alone or two or more of these commercially available products may be used in combination.

The thermally degradable volume-expanding agent used is an organic foaming agent or an inorganic foaming agent.

Examples of the organic foaming agent include, but are not limited to, azo-dicarboxylic acid amide (ADCA), azobisisobutylnitrile (AIBN), p,p'-oxybisbenzene sulfonyl hydrazide (OBSH), and dinitrosopentamethylenetetramine (DPT). One of these organic foaming agents may be used alone or two or more of these organic foaming agents may be used in combination.

Examples of the inorganic foaming agent include, but are not limited to, hydrogen carbonates such as sodium hydrogen carbonate, carbonates, and combinations of hydrogen carbonates with organic acid salts.

The content of the foaming agent is not particularly limited and may be appropriately selected depending on the intended purpose. It is preferably 1% by mass or more but 20% by mass or less, more preferably 5% by mass or more but 15% by mass or less, relative to the total amount of the coating liquid.

—Active Energy Ray Curable Material—

The active energy ray curable material may be an active energy ray curable material having a radical-polymerizable functional group, which contains a multifunctional active energy ray curable material having two or more radical-polymerizable functional groups. The active energy ray curable material having a radical-polymerizable functional group may contain not only the multifunctional active energy ray curable material (hereinafter may be referred to as a multifunctional monomer) but also a monofunctional active energy ray curable material (hereinafter may be referred to as a monofunctional monomer).

——Multifunctional Monomer——

The multifunctional monomer is a compound that contains two or more vinyl groups, two or more acryloyl groups, and/or two or more methacryloyl groups in a molecular structure thereof.

Examples of the multifunctional monomer include, but are not limited to, ethyleneglycol di(meth)acrylate, hydroxypivalic acid neopentylglycol di(meth)acrylate, polytetramethyleneglycol di(meth)acrylate, diethyleneglycol di(meth)acrylate, triethyleneglycol di(meth)acrylate, tetraethyleneglycol di(meth)acrylate, polyethyleneglycol dimethacrylate [$CH_2$=CH—CO—($OC_2H_4$)n-OCOCH=$CH_2$ (n≈9), the same (n≈14), and the same dipropyleneglycol di(meth)acrylate, tripropyleneglycol di(meth)acrylate, polypropyleneglycol dimethacrylate [$CH_2$=C($CH_3$)—CO—($OC_3H_6$)$_n$—OCOC($CH_3$)=$CH_2$ (n≈7)], 1,3-butanediol di(meth)acrylate, 1,4-butanediol di(meth)acrylate, 1,6-hexanediol di(meth)acrylate, 1,9-nonanediol di(meth)acrylate, neopentylglycol di(meth)acrylate, tricyclodecanedimethanol di(meth)acrylate, propylene oxide-modified bisphenol A di(meth)acrylate, polyethylene glycol di(meth)acrylate, dipentaerythritol hexa(meth)acrylate, propylene oxide-modified tetramethylolmethane tetra(meth)acrylate, dipentaerythritol hydroxypenta(meth)acrylate, caprolactone-modified dipentaerythritol hydroxypenta(meth)acrylate, ditrimethylolpropane tetra(meth)acrylate, pentaerythritol tetra(meth)acrylate, trimethylolpropane tri(meth)acrylate, ethylene oxide-modified trimethylolpropane tri(meth)acrylate, propylene oxide-modified trimethylolpropane tri(meth)acrylate, caprolactone-modified trimethylolpropane tri(meth)acrylate, pentaerythritol tri(meth)acrylate, tris(2-hydroxyethyl)isocyanurate tri(meth)acrylate, ethoxylated neopentylglycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, polyurethane di(meth)acrylate, polyurethane tri(meth)acrylate, polyurethane tetra(meth)acrylate, polyurethane penta(meth)acrylate, polyurethane poly(meth)acrylate, triethyleneglycoldivinyl ether, cyclohexanedimethanoldivinyl ether, diethyleneglycoldivinyl ether, triethyleneglycoldivinyl ether, and ethoxylated (4) bisphenol di(meth)acrylate. One of these multifunctional monomers may be used alone or two or more of these multifunctional monomers may be used in combination.

The content of the multifunctional monomer is preferably 40% by mass or more but 90% by mass or less, more preferably 60% by mass or more but 80% by mass or less, relative to the total amount of the coating liquid. When the content of the multifunctional monomer falls within this range, there is an advantage that a design property (volume expansibility) and robustness can be successfully satisfied at the same time.

——Monofunctional Monomer——

The monofunctional monomer contains one vinyl group, one acryloyl group, or one methacryloyl group in a molecular structure thereof.

Examples of the monofunctional monomer include, but are not limited to, γ-butyrolactone (meth)acrylate, isobornyl (meth)acrylate, formalized trimethylolpropane mono(meth)acrylate, trimethylolpropane (meth)acrylic acid benzoic acid ester, (meth)acryloylmorpholine, 2-hydroxypropyl (meth)acrylamide, N-vinylcaprolactam, N-vinylpyrrolidone, N-vinylformamide, cyclohexanedimethanolmonovinyl ether, hydroxyethylvinyl ether, diethyleneglycolmonovinyl ether, dicyclopentadiene vinyl ether, tricyclodecane vinyl ether, benzylvinyl ether, ethyloxetanemethyl vinyl ether, hydroxybutyl vinyl ether, ethyl vinyl ether, ethoxylated (4) nonylphenol (meth)acrylate, benzyl (meth)acrylate, caprolactone (meth)acrylate, and 2-acryloyloxypropyl phthalic acid. One of these monofunctional monomers may be used alone or two or more of these monofunctional monomers may be used in combination.

Among these monofunctional monomers, isobornyl (meth)acrylate and ethoxylated (4) nonylphenol (meth)acrylate are preferable because these have a high glass transition temperature (Tg) and good robustness.

The content of the monofunctional monomer is preferably 10% by mass or more but 50% by mass or less, more preferably 20% by mass or more but 40% by mass or less, relative to the total amount of the coating liquid.

——Polymerization Initiator——

Examples of the polymerization initiator include, but are not limited to, a thermal polymerization initiator and a photopolymerization initiator. Among these polymerization initiators, a photopolymerization initiator is preferable in terms of a design property attributable to a bossed-recessed shape and durability.

The photopolymerization initiator needs at least to be able to produce active species such as radicals and cations in response to energy of active energy rays and initiate polymerization of a polymerizable compound. As such a polymerization initiator, one of, for example, known radical polymerization initiators, cationic polymerization initiators, and base generators may be used alone or two or more of these known radical polymerization initiators, cationic polymerization initiators, and base generators may be used in combination. Among these polymerization initiators, a radical polymerization initiator is preferable.

The content of the polymerization initiator is preferably 1% by mass or more but 20% by mass or less, more preferably 5% by mass or more but 15% by mass or less, relative to the total amount of the coating liquid in order to obtain a sufficient curing speed.

Examples of the radical polymerization initiator include, but are not limited to, aromatic ketones, acylphosphine oxide compounds, aromatic onium salt compounds, organic peroxides, thio compounds (e.g., thioxanthone compounds, and thiophenyl group-containing compounds), hexaaryl biimidazole compounds, ketoxime ester compounds, borate compounds, azinium compounds, metallocene compounds, active ester compounds, compounds containing a carbon halogen bond(s), and alkyl amine compounds.

A polymerization accelerator (sensitizer) may be used in combination with the polymerization initiator.

The polymerization accelerator is not particularly limited and may be appropriately selected depending on the intended purpose. Examples of the polymerization accelerator include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone.

The content thereof is determined depending on the identity (type) of the polymerization initiator and the content thereof ——Other Components——

The other components are not particularly limited and may be appropriately selected depending on the intended purpose. Examples of the other components include, but are not limited to, a filler, a volume expansion accelerator, a dispersant, a colorant, an organic solvent, an antiblocking agent, a thickener, an antiseptic, a stabilizer, a deodorant, a fluorescent agent, and an ultraviolet screener.

——Filler——

Examples of the filler include, but are not limited to, aluminum hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silica, titanium dioxide, and magnesium silicate. One of these fillers may be used alone or two or more of these fillers may be used in combination. Among these fillers, calcium carbonate, magnesium carbonate, aluminum hydroxide, and magnesium hydroxide are preferable.

——Volume Expansion Accelerator——

The volume expansion accelerator is not particularly limited and may be appropriately selected depending on the intended purpose. Examples of the volume expansion accelerator include, but are not limited to, zinc naphthenate, zinc acetate, zinc propionate, zinc 2-ethylpentanoate, zinc 2-ethyl-4-methylpentanoate, zinc 2-methylhexanoate, zinc 2-ethylhexanoate, zinc isooctylate, zinc n-octylate, zinc neodecanoate, zinc isodecanoate, zinc n-decanoate, zinc laurate, zinc myristate, zinc palmitate, zinc stearate, zinc isostearate, zinc 12-hydroxystearate, zinc behenate, zinc oleate, zinc linoleate, zinc linolenate, zinc ricinoleate, zinc benzoate, zinc o, m, or p-toluate, zinc p-t-butylbenzoate, zinc salicylate, zinc phthalate, zinc salts of phthalic acid monoalkyl (C4 to 18) esters, zinc dehydroacetate, zinc dibutyldithiocarbamate, zinc aminocrotonate, a zinc salt of 2-mercaptobenzothiazole, zinc pyrithione, and zinc complexes of urea or diphenylurea. One of these volume expansion accelerators may be used alone or two or more of these volume expansion accelerators may be used in combination.

——Thickener——

Examples of the thickener include, but are not limited to, polycyanoacrylate, polylactic acid, polyglycolic acid, polycaprolactone, polyacrylic acid alkyl ester, and polymethacrylic acid alkyl ester.

——Antiseptic——

Examples of the antiseptic include, but are not limited to, antiseptics that have been hitherto used and do not initiate polymerization of monomers, such as potassium sorbate, sodium benzoate, sorbic acid, and chlorocresol.

——Stabilizer——

The stabilizer serves to suppress polymerization of a monomer under storage. Examples of the stabilizer include, but are not limited to, anionic stabilizers and free radical stabilizers.

Examples of the anionic stabilizers include, but are not limited to, metaphosphoric acid, maleic acid, maleic anhydride, alkyl sulfonic acid, phosphorus pentoxide, iron(III) chloride, antimony oxide, 2,4,6-trinitrophenol, thiol, alkylsulfonyl, alkylsulfone, alkylsulfoxide, alkyl sulfite, sulton, sulfur dioxide, and sulfur trioxide.

Examples of the free radical stabilizers include, but are not limited to, hydroquinone and catechol, or derivatives of hydroquinone and catechol.

<<Viscosity of Coating Liquid>>

The viscosity of the coating liquid is not particularly limited and may be appropriately selected depending on the intended purpose. It is preferably 50 mPa·s or more but 1,000 mPa·s or less at 25 degrees C., more preferably 100 mPa·s or more but 500 mPa·s or less at 25 degrees C. When the viscosity of the coating liquid at 25 degrees C. is 50 mPa·s or more but 1,000 mPa·s or less, qualities of the liquid film formed by coating the coating liquid can be improved, such as permeation of the foaming accelerator and uniformity of the foamed layer precursor.

Incidentally, the viscosity can be measured by a cone plate rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<<Preparation of Coating Liquid>>

The coating liquid used in the present disclosure can be prepared using the above-described components, and preparation methods and conditions are not particularly limited.

The method for coating the base with the coating liquid is not particularly limited and may be appropriately selected depending on the intended purpose. Examples of the method include, but are not limited to, coating methods such as knife coating, nozzle coating, die coating, lip coating, comma coating, gravure coating, rotary screen coating, reverse roll coating, roll coating, spin coating, kneader coating, bar coating, blade coating, casting, dipping, and curtain coating, and an inkjet method.

The average thickness of the liquid film formed by coating the base with the coating liquid is not particularly limited and may be appropriately selected depending on the intended purpose. It is preferably 25 micrometers or more, more preferably 100 micrometers or more, further preferably 150 micrometers or more, particularly preferably 250 micrometers or more but 500 micrometers or less.

When the average thickness of the liquid film is 25 micrometers or more, the resultant foamed layer can have level differences of bosses and recesses and can be provided with a design property attributable to an excellent bossed-recessed shape.

<<Foaming Accelerator-Containing Ink>>

In the present disclosure, the foamed layer precursor is formed by applying an ink by an inkjet method onto the liquid film formed by applying the coating liquid, where the ink contains a foaming accelerator having a radical-polymerizable functional group (hereinafter this ink may be referred to as a foaming accelerator-containing ink).

The foaming accelerator-containing ink is applied onto portions intended for foaming in the foamed layer.

In one embodiment, the ink contains a foaming accelerator having a radical-polymerizable functional group and, if necessary, further contains other components.

A functional group equivalent of the radical-polymerizable functional group in the foaming accelerator is greater than a functional group equivalent of the radical-polymerizable functional group in the active energy ray curable material in the coating liquid. Further, it is desirable to control the functional group equivalent to be equal to or greater than a certain level upon attachment and permeation of the foaming accelerator.

The functional group equivalent after the permeation is preferably 128 or more but 240 or less, more preferably 138 or more but 237 or less. When the functional group equivalent is in this range, it is possible to form various bossed-recessed shapes.

In one embodiment, the ink contains a monofunctional foaming accelerator having one radical polymerizable functional group and, if necessary, further contains other components.

As the monofunctional foaming accelerator having one radical polymerizable functional group, those similar to the monofunctional monomers in the coating liquid can be used. Besides, alkoxylated lauryl acrylate and other monofunctional monomers can be used.

The ink containing a monofunctional monomer as the foaming accelerator can have weak three-dimensional cross-linkability. Thus, there is an advantage that a design property attributable to an excellent bossed-recessed shape can be imparted to the foamed body because on/off of foaming can be controlled by applying the ink onto any part of the foamable layer and applying energy to that part.

The method for applying the ink is an inkjet method because the inkjet method can flexibly adapt to various foaming patterns (foaming accelerating patterns).

In the inkjet method, for example, the driving method of a discharging head may be a method employing an on-demand head using, for example, PZT as a piezoelectric element actuator, a method of applying thermal energy, or an electrostatic force-applied actuator, and a method employing a continuous jet-type charge control-type head.

The amount of the ink applied is not particularly limited and may be appropriately selected depending on the intended purpose. It is preferably 0.1 microliters/cm$^2$ or more but 2.8 microliters/cm$^2$ or less relative to the surface area of the liquid film.

In the present disclosure, the method may include, after applying the ink onto the liquid film, a step of curing the liquid film and the ink with active energy rays.

—Active Energy Rays—

Active energy rays are not particularly limited, so long as they are able to give necessary energy for allowing polymerization reaction of polymerizable components in the composition to proceed. Examples of the active energy rays include, but are not limited to, electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet rays, mercury-free is preferred in terms of protection of environment. Therefore, replacement with GaN-based semiconductor ultraviolet light-emitting devices is preferable from industrial and environmental point of view. Furthermore, an ultraviolet light-emitting diode (UV-LED) and an ultraviolet laser diode (UV-LD) are preferable as an ultraviolet light source. Small sizes, long time working life, high efficiency, and high cost performance make such irradiation sources desirable.

The curing conditions are not particularly limited and may be appropriately selected depending on the intended purpose. For ultraviolet rays, an irradiator that can irradiate a target with ultraviolet rays at an intensity of 6 W/cm or higher from an irradiation distance of 2 mm is preferable.

For electron beams, an accelerating voltage that can give a dose of 15 kGy or higher to the farthest position of the curing target from an electron beam irradiator is preferable.

<Ink-Receiving Layer Forming Step and Unit>

An ink-receiving layer forming step is a step of forming an ink-receiving layer on a foamed layer precursor, where the ink-receiving layer contains a polymer of an active energy ray curable material.

An ink-receiving layer forming unit is a unit configured to form an ink-receiving layer on a foamed layer precursor, where the ink-receiving layer contains a polymer of an active energy ray curable material.

The ink-receiving layer forming step is not particularly limited so long as the ink-receiving layer forming step can form an ink-receiving layer. For example, it is preferable to apply an ink-receiving layer forming liquid containing an active energy ray curable material on a base to form a film and then cure the film to form an ink-receiving layer. In other words, in the ink-receiving layer forming step, it is preferable to apply an ink-receiving layer forming liquid containing an active energy ray curable material on a foamable layer and then cure the ink-receiving layer forming liquid to form an ink-receiving layer.

<<Ink-Receiving Layer Forming Liquid>>

The ink-receiving layer forming liquid contains an active energy ray curable material, preferably contains a polymerization initiator, and if necessary, further contains other components such as a polymerization accelerator and a surfactant.

—Active Energy Ray Curable Material—

The active energy ray curable material is a monomer or oligomer containing a functional group such as a vinyl group, an acryloyl group, or methacryloyl group in a molecular structure thereof. Examples of the active energy ray curable material include, but are not limited to, a monofunctional monomer having one functional group, a multifunctional monomer having one or more functional groups, and a multifunctional oligomer. Further, examples of the active energy ray curable material based on the kind of the molecular structure include, but are not limited to, a urethane oligomer, an epoxy acrylate oligomer, and a polyester acrylate oligomer.

Examples of the monofunctional monomer include, but are not limited to, γ-butyrolactone (meth)acrylate, isobornyl (meth)acrylate, formalized trimethylolpropane mono(meth)acrylate, trimethylolpropane (meth)acrylic acid benzoic acid ester, (meth)acryloylmorpholine, 2-hydroxypropyl (meth) acrylamide, N-vinylcaprolactam, N-vinylpyrroli done, N-vinylformamide, cyclohexanedimethanolmonovinyl ether, hydroxyethylvinyl ether, diethyleneglycolmonovinyl ether, dicyclopentadiene vinyl ether, tricyclodecane vinyl ether, benzylvinyl ether, ethyloxetanemethyl vinyl ether, hydroxybutyl vinyl ether, ethyl vinyl ether, ethoxylated (4) nonylphenol (meth)acrylate, benzyl (meth)acrylate, and caprolactone (meth)acrylate. One of these monofunctional monomers may be used alone or two or more of these monofunctional monomers may be used in combination.

Examples of the multifunctional monomer include, but are not limited to, ethyleneglycol di(meth)acrylate, hydroxypivalic acid neopentylglycol di(meth)acrylate, polytetramethyleneglycol di(meth)acrylate, diethyleneglycol di(meth)acrylate, triethyleneglycol di(meth)acrylate, tetraethyleneglycol di(meth)acrylate, polyethyleneglycol dimethacrylate [$CH_2$=CH—CO—($OC_2H_4$)n-OCOCH=$CH_2$ (n≈9), the same (n≈14), and the same (n≈23)], dipropyleneglycol di(meth)acrylate, tripropyleneglycol di(meth) acrylate, polypropyleneglycol dimethacrylate [$CH_2$=C($CH_3$)—CO—($OC_3H_6$)$_n$—OCOC($CH_3$)=$CH_2$ (n≈7)], 1,3-butanediol di(meth)acrylate, 1,4-butanediol di(meth) acrylate, 1,6-hexanediol di(meth)acrylate, 1,9-nonanediol di(meth)acrylate, neopentylglycol di(meth)acrylate, tricyclodecanedimethanol di(meth)acrylate, propylene oxide-modified bisphenol A di(meth)acrylate, polyethylene glycol di(meth)acrylate, dipentaerythritol hexa(meth)acrylate, propylene oxide-modified tetramethylolmethane tetra(meth) acrylate, dipentaerythritol hydroxypenta(meth)acrylate, caprolactone-modified dipentaerythritol hydroxypenta (meth)acrylate, ditrimethylolpropane tetra(meth)acrylate, pentaerythritol tetra(meth)acrylate, trimethylolpropane tri(meth)acrylate, ethylene oxide-modified trimethylolpropane tri(meth)acrylate, propylene oxide-modified trimethylolpropane tri(meth)acrylate, caprolactone-modified trimethylolpropane tri(meth)acrylate, pentaerythritol tri(meth)acrylate, tris(2-hydroxyethyl)isocyanurate tri(meth)acrylate, ethoxylated neopentylglycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly (meth)acrylate, polyurethane di(meth)acrylate, polyurethane tri(meth)acrylate, polyurethane tetra(meth)acrylate, polyurethane penta(meth)acrylate, polyurethane poly(meth)acrylate, triethyleneglycoldivinyl ether, cyclohexanedimethanoldivinyl ether, diethyleneglycoldivinyl ether, triethyleneglycoldivinyl ether, and ethoxylated (4) bisphenol di(meth)acrylate. One of these multifunctional monomers may be used alone or two or more of these multifunctional monomers may be used in combination.

Also, a combination of a monofunctional monomer and a multifunctional monomer or a combination of a monofunctional monomer and a multifunctional oligomer may be used as a mixture composition. In this case, in terms of robustness, the content of a multifunctional monomer or a multifunctional oligomer is preferably 50% by mass or more relative to the total amount of the ink-receiving layer forming liquid.

The polymerization initiator produces active species such as a radical or a cation upon application of energy of active energy rays or heat and initiates polymerization of the ink-receiving layer forming liquid. As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 1% by mass or more but 20% by mass or less of the total amount of the ink-receiving layer forming liquid to obtain sufficient curing speed.

Examples of the radical polymerization initiator include, but are not limited to, aromatic ketones, acylphosphine oxide compounds, aromatic onium salt compounds, organic peroxides, thio compounds (e.g., thioxanthone compounds, thiophenyl group-containing compounds), hexaaryl biimidazole compounds, ketoxime ester compounds, borate compounds, azinium compounds, metallocene compounds, active ester compounds, compounds having a carbon halogen bond(s), and alkyl amine compounds.

The polymerization accelerator is not particularly limited and may be appropriately selected depending on the intended purpose. Examples of the polymerization accelerator include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

The surfactant is not particularly limited and may be appropriately selected depending on the intended purpose. Examples of the surfactant include, but are not limited to: glycerin fatty acid esters such as glycerin fatty acid ester, sorbitan fatty acid ester, polyethylene glycol fatty acid ester, glyceryl monostearate, glyceryl monooleate, diglyceryl monostearate, and diglyceryl monoisostearate; glycol fatty acid esters such as propyleneglycol monostearate; sorbitan fatty acid esters such as sorbitan monostearate and sorbitan monooleate; and sucrose stearic acid ester, POE (4.2) lauryl ether, POE (40) hydrogenated castor oil, POE (10) cetyl ether, POE (9) lauryl ether, POE (10) oleyl ether, POE (20) sorbitan monooleate, POE (6) sorbit monolaurate, POE (15) cetyl ether, POE (20) sorbitan monopalmitate, POE (15) oleyl ether, POE (100) hydrogenated castor oil, POE (20) POP (4) cetyl ether, POE (20) cetyl ether, POE (20) oleyl ether, POE (20) stearyl ether, POE (50) oleyl ether, POE (25) cetyl ether, POE (25) lauryl ether, POE (30) cetyl ether, and POE (40) cetyl ether. One of these surfactants may be used alone or two or more of these surfactants may be used as a mixture.

It is preferable to add the surfactant in an amount of, for example, 0.1% by mass or more but 2% by mass or less relative to the total amount of the ink-receiving layer forming liquid.

—Polymerization Initiator—

As the polymerization initiator, those similar to the polymerization initiator in the coating liquid of the foamed layer precursor can be used.

—Other Components—

The other components in the ink-receiving layer forming liquid are not particularly limited and may be appropriately selected depending on the intended purpose. Those similar to the other components in the coating liquid can be selected.

The method for applying the ink-receiving layer forming liquid onto the foamable layer is not particularly limited and may be appropriately selected depending on the intended purpose. Examples of the method include, but are not limited to, coating methods such as knife coating, nozzle coating, die coating, lip coating, comma coating, gravure coating, rotary screen coating, reverse roll coating, roll coating, spin coating, kneader coating, bar coating, blade coating, casting, dipping, and curtain coating, and an inkjet method.

<Image Forming Step and Unit>

The image forming step is a step of applying an ink onto the foamed layer precursor to form an ink layer and curing the ink layer with active energy rays to form an image, where the ink contains an active energy ray curable material and a colorant.

The image forming unit is a unit configured to apply an ink onto the foamed layer precursor to form an ink layer and cure the ink layer with active energy rays to form an image, where the ink contains an active energy ray curable material and a colorant.

The ink forming the ink layer may contain a colorant composition containing a colorant.

<<Colorant Composition>>

The colorant composition contains a colorant. From the viewpoints of a design property attributable to a bossed-recessed shape and durability of image quality, the colorant composition preferably contains an active energy ray curable material and a polymerization initiator. If necessary, the colorant composition further contains other components.

—Colorant—

As the colorant, various pigments and dyes may be used that impart black, white, magenta, cyan, yellow, green, orange, and gloss colors such as gold and silver, depending on the intended purpose of the colorant composition and requisite properties thereof.

A content of the colorant in the colorant composition is not particularly limited, and may be appropriately determined considering, for example, a desired color density and dispersibility of the colorant in the colorant composition. However, it is preferably 0.1% by mass or more but 20% by mass or less, more preferably 1% by mass or more but 10% by mass or less, relative to the total amount of the colorant composition.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, polymer dispersants conventionally used to prepare pigment dispersion (material).

The dyes include, for example, acidic dyes, direct dyes, reactive dyes, basic dyes, and combinations thereof.

—Active Energy Ray Curable Material—

As the active energy ray curable material, those similar to the active energy ray curable material in the coating liquid in the foamed layer precursor forming step can be used.

—Polymerization Initiator—

As the polymerization initiator, those similar to the polymerization initiator in the coating liquid in the foamed layer precursor forming step can be used.

<Other Components>

The other components are not particularly limited and may be appropriately selected depending on the intended purpose. Specific examples thereof include, but are not limited to, organic solvents, surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters (regulators), and thickeners.

——Organic Solvent——

The colorant composition used in the present disclosure optionally contains an organic solvent although it is preferable to spare it. The composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1% by mass.

—Preparation of Colorant Composition—

The colorant composition used in the present disclosure can be prepared by using the components described above. The preparation devices and conditions are not particularly limited. For example, the colorant composition can be prepared by subjecting a pigment as the colorant, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, a polymerization initiator, a polymerization inhibitor, and a surfactant.

<<Viscosity of Colorant Composition>>

The viscosity of the colorant composition used in the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a method similar to the measurement method for the viscosity of the coating liquid.

The method for applying the ink forming the ink layer onto the foamed layer precursor is not particularly limited and may be appropriately selected depending on the intended purpose. An inkjet method is preferable because the inkjet method can flexibly adapt to productivity and a wide variety of products in small lots.

In the inkjet method, for example, the driving method of a discharging head may be a method employing an on-demand head using, for example, PZT as a piezoelectric element actuator, a method of applying thermal energy, or an electrostatic force-applied actuator, and a method employing a continuous jet-type charge control-type head.

Formation of the ink layer by applying the ink forming the ink layer is followed by curing of the ink layer with active energy rays to form an image.

<Foamed Layer Forming Step and Unit>

The foamed layer forming step is a step of foaming a desired position of the foamed layer precursor by heating to form a foamed layer.

The foamed layer forming unit is a unit configured to foam a desired position of the foamed layer precursor by heating to form a foamed layer.

The foamed layer forming unit is not particularly limited and may be appropriately selected depending on the intended purpose so long as it is a unit configured to foam the foaming agent in the foamed layer precursor by heating. Examples of the foamed layer forming unit include, but are not limited to, an infrared heater, a hot air heater, and a heat roller.

The temperature of the heating is not particularly limited and may be appropriately selected depending on the intended purpose so long as it is equal to or higher than the thermal degradation temperature of the foaming agent. The temperature of the heating is preferably 100 degrees C. or higher but 200 degrees C. or lower.

The average thickness of the foamed layer is not particularly limited and may be appropriately selected depending on the intended purpose. It is preferably 100 micrometers or greater, more preferably 310 micrometers or greater, further preferably 400 micrometers or greater, particularly preferably 400 micrometers or greater but 2,000 micrometers or less.

When the average thickness of the foamed layer is 100 micrometers or greater, the foamed layer can have level differences of bosses and recesses by virtue of the volume expansion accelerator and can be provided with a design property attributable to an excellent bossed-recessed shape.

<Other Steps and Units>

The other steps are not particularly limited and may be appropriately selected depending on the intended purpose. Examples of the other steps include, but are not limited to, a protective layer forming step of forming a protective layer, an embossing step, a bending step, a cutting step, and a controlling step.

The other units are not particularly limited and may be appropriately selected depending on the intended purpose. Examples of the other units include, but are not limited to, a protective layer forming unit configured to form a protective layer, an embossing unit, a bending unit, a cutting unit, and a controlling unit.

The method of the present disclosure for producing a foamed body can produce a foamed body having a design property attributable to an excellent bossed-recessed shape and excellent durability, and thus is suitable for applications of building materials such as flooring, wallpaper, interior materials, wall-plate materials, baseboard materials, ceiling materials, and pillars.

Furthermore, a set of the coating liquid and the foaming accelerator-containing ink of the present disclosure can be used as a set to form two-dimensional and two-and-a-half dimensional texts, images, and designed coating film on various substrates and in addition as a solid object forming material to form a three-dimensional object.

In addition, the present disclosure includes cured materials obtained by curing the set of the coating liquid and the foaming accelerator-containing ink and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras, which need molding after decoration of surfaces thereof.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

EXAMPLES

The present disclosure will be described by way of Examples, which however should not be construed as limiting the present disclosure thereto in any way.

Example 1

Figure 1:
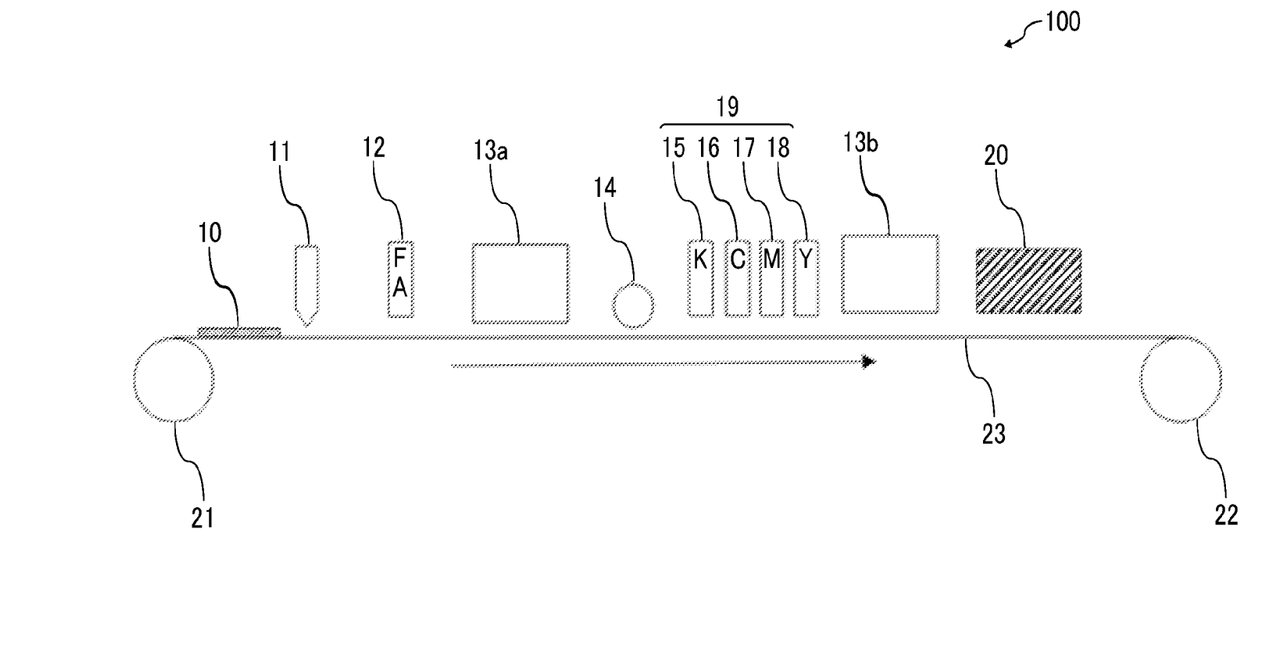

FIG. 1 is a schematic view illustrating a device for producing a foamed body used in the method of the present disclosure for producing a foamed body. A device 100 for producing a foamed body illustrated in FIG. 1 includes: a coating liquid applicator 11 configured to apply coating liquid A onto a base 10; and downstream thereof, a head 12 for a foaming accelerator-containing ink; an ink-receiving layer application roller 14; discharging heads 19 including a head 15 for black, a head 16 for cyan, a head 17 for magenta, and a head 18 for yellow; active energy ray irradiators 13a and 13b; and a heater 20. Incidentally, FIG. 1 also illustrates a conveyor belt 23, a feeding roller 21, and a winding roller 22. The base is conveyed in the direction of the arrow in FIG. 1 with the conveyor belt 23 wound up by the winding roller 22.

The head 12 and the discharging heads 19 were MH5420 (600 dpi) obtained from Ricoh Company, Ltd. Five heads of the head 12, the head 15, the head 16, the head 17, and the head 18 were arranged shoulder by shoulder. Each of the heads was heated to 45 degrees C. and the frequency was controlled so that drawing could be performed at a droplet amount of 40 pL.

The active energy ray irradiators 13a and 13b were EC300/30/30 mA obtained from IWASAKI ELECTRIC CO., LTD. In an inert gas blanket, a compressor-equipped $N_2$ gas generator (Maxi-Flow30, obtained from Inhouse Gas) serving as an inert gas source was connected at a pressure of 0.2 MPa·s to allow $N_2$ to flow at a flow rate of from 2 L/min through 10 L/min so that the oxygen concentration would be 500 ppm or lower.

The heater 20 was a heater produced by combining VORTEX BLOWER G SERIES obtained from Hitachi Industrial Equipment Systems Co., Ltd., a high hot air-generating electric heater XS-2 obtained from K.K. Kansai Dennetsu, and a high-blow nozzle 50AL obtained from K.K. Kansai Dennetsu and adjusting a wind speed from the nozzle tip to 30 m/sec.

First, a surface of a paper sheet having a basis weight of 80 g/m² (high-grade plain paper RJPH-03, obtained from OSTRICHDIA CO., LTD.) serving as the base 10 was coated with the below-prepared coating liquid A by the coating liquid applicator 11 so that the average thickness after curing would be 150 micrometers, to form a liquid film.

Next, with the base on which the liquid film had been formed was scanned at a speed of 15 m/min, the below-prepared foaming accelerator-containing ink A was discharged onto the entire surface of the liquid film from the head 12 by an inkjet method at a discharge amount per unit area of 2.2 microliters/cm². In this discharging, the discharging speed was 7 m/sec and the discharging frequency was 1.2 kHz.

Next, under irradiation conditions of an accelerating voltage of 30 kV and a dose of kGy, the active energy ray irradiator 13a was used to irradiate the liquid film and the ink with active energy rays for curing to form a foamed layer precursor.

Next, the ink-receiving layer application roller 14 was used to apply the below-prepared ink-receiving layer forming liquid A onto the foamed layer precursor.

Next, the below-prepared black colorant composition A was discharged onto the entire surface of the resultant from the head 15 by an inkjet method to form an ink layer.

Next, under irradiation conditions of an accelerating voltage of 30 kV and a dose of kGy, the active energy ray irradiator 13b was used to irradiate the foamed layer precursor and the ink layer with active energy rays for curing.

Next, the obtained cured material was heated by the heater 20 at 170 degrees C. for 10 seconds, and foaming occurred at the heated parts of the foamed layer precursor. Through the above-described procedure, a foamed body of Example 1 was obtained.

<Preparation of Coating Liquid A>

MICROSPHERE (F-48, obtained from Matsumoto Yushi-Seiyaku Co., Ltd.) (5 parts by mass) serving as the volume-expanding agent and 2,4,6-trimethylbenzoyl-diphenylphosphine oxide (Omnirad TPO, obtained from Irgacure) (1.5 parts by mass) serving as the polymerization initiator were added to active energy ray curable materials including isobornyl acrylate (SR506, obtained from Tomoe Engineering Co., Ltd.) (20 parts by mass), tricyclodecanedimethanol diacrylate (SR833, obtained from Tomoe Engineering Co., Ltd.) (20 parts by mass), and ethoxylated (4) nonylphenol acrylate (SR504, obtained from Tomoe Engineering Co., Ltd.) (10 parts by mass), followed by stirring, to prepare coating liquid A.

The functional group equivalent in the active energy ray curable materials of coating liquid A was found to be 234 g/eq.

<Preparation of Foaming Accelerator-Containing Ink A>

Alkoxylated lauryl acrylate (CD9075, obtained from Tomoe Engineering Co., Ltd.) (100 parts by mass) serving as the monofunctional monomer and 2,4,6-trimethylbenzoyl-diphenylphosphine oxide (Omnirad TPO, obtained from Irgacure) (5 parts by mass) serving as the polymerization initiator were stirred to prepare foaming accelerator-containing ink A. The functional group equivalent in the foaming accelerator of foaming accelerator-containing ink A was found to be 416 g/eq.

<Preparation of Ink-Receiving Layer Forming Liquid A>

2-Acryloyloxypropyl phthalic acid (ACB-1, obtained from Shin-Nakamura Chemical Co., Ltd.) (100 parts by mass) and 2,4,6-trimethylbenzoyl-diphenylphosphine oxide (Omnirad TPO, obtained from Irgacure) (5 parts by mass) were stirred to prepare ink-receiving layer forming liquid A.

<Preparation of Black Colorant Composition A>

Acryloylmorpholine (obtained from Tokyo Chemical Industry Co., Ltd.) (60 parts by mass), isobornyl acrylate (SR506, obtained from Tomoe Engineering Co., Ltd.) (20 parts by mass), and SPECIAL BLACK 250 (black pigment, obtained from BASF Japan Ltd.) (40 parts by mass) serving as the colorant were stirred to prepare black colorant composition A.

Example 2

A foamed body was obtained in the same manner as in Example 1 except that foaming accelerator-containing ink A was changed to the below-prepared foaming accelerator-containing ink B.

<Preparation of Foaming Accelerator-Containing Ink B>

Alkoxylated lauryl acrylate (CD9075, obtained from Tomoe Engineering Co., Ltd.) (100 parts by mass) serving as the monofunctional monomer, trimethylolpropane triacrylate (SR351, obtained from Tomoe Engineering Co., Ltd.) (10 parts by mass), and 2,4,6-trimethylbenzoyl-diphenylphosphine oxide (Omnirad TPO, obtained from Irgacure) (5.5 parts by mass) serving as the polymerization initiator were stirred to prepare foaming accelerator-containing ink B.

The functional group equivalent in the foaming accelerator of foaming accelerator-containing ink B was found to be 387 g/eq.

Example 3

A foamed body was obtained in the same manner as in Example 1 except that coating liquid A was changed to the below-prepared coating liquid B and foaming accelerator-containing ink A was changed to the below-prepared foaming accelerator-containing ink C.

<Preparation of Coating Liquid B>

MICROSPHERE (F-48, obtained from Matsumoto Yushi-Seiyaku Co., Ltd.) (5 parts by mass) serving as the volume-expanding agent and 2,4,6-trimethylbenzoyl-diphenylphosphine oxide (Omnirad TPO, obtained from Irgacure) (1.5 parts by mass) serving as the polymerization initiator were added to active energy ray curable materials including isobornyl acrylate (SR506, obtained from Tomoe Engineering Co., Ltd.) (10 parts by mass), tricyclodecanedimethanol diacrylate (SR833, obtained from Tomoe Engineering Co., Ltd.) (20 parts by mass), and ethoxylated (4) nonylphenol acrylate (SR504, obtained from Tomoe Engineering Co., Ltd.) (10 parts by mass), followed by stirring, to prepare coating liquid B.

The functional group equivalent in the active energy ray curable materials of coating liquid B was found to be 241 g/eq.

<Preparation of Foaming Accelerator-Containing Ink C>

Alkoxylated lauryl acrylate (CD9075, obtained from Tomoe Engineering Co., Ltd.) (100 parts by mass) serving as the monofunctional monomer, trimethylolpropane triacrylate (SR351, obtained from Tomoe Engineering Co., Ltd.) (25 parts by mass), and 2,4,6-trimethylbenzoyl-diphenylphosphine oxide (Omnirad TPO, obtained from Irgacure) (6 parts by mass) serving as the polymerization initiator were stirred to prepare foaming accelerator-containing ink C.

The functional group equivalent in the foaming accelerator of foaming accelerator-containing ink C was found to be 354 g/eq.

Comparative Example 1

A foamed body was obtained in the same manner as in Example 1 except that coating liquid A was changed to the below-prepared coating liquid C and foaming accelerator-containing ink A was changed to the below-prepared foaming accelerator-containing ink D.

<Preparation of Coating Liquid C>

MICROSPHERE (F-48, obtained from Matsumoto Yushi-Seiyaku Co., Ltd.) (5 parts by mass) serving as the volume-expanding agent and 2,4,6-trimethylbenzoyl-diphenylphosphine oxide (Omnirad TPO, obtained from Irgacure) (1.5 parts by mass) serving as the polymerization initiator were added to active energy ray curable materials including isobornyl acrylate (SR506, obtained from Tomoe Engineering Co., Ltd.) (20 parts by mass), tricyclodecanedimethanol diacrylate (SR833, obtained from Tomoe Engineering Co., Ltd.) (20 parts by mass), and ethoxylated (4) nonylphenol acrylate (SR504, obtained from Tomoe Engineering Co., Ltd.) (10 parts by mass), followed by stirring, to prepare coating liquid C.

The functional group equivalent in the active energy ray curable materials of coating liquid C was found to be 234 g/eq.

<Preparation of Foaming Accelerator-Containing Ink D>

Alkoxylated lauryl acrylate (CD9075, obtained from Tomoe Engineering Co., Ltd.) (20 parts by mass) serving as the monofunctional monomer, trimethylolpropane triacrylate (SR351, obtained from Tomoe Engineering Co., Ltd.) (30 parts by mass), and 2,4,6-trimethylbenzoyl-diphenylphosphine oxide (Omnirad TPO, obtained from Irgacure) (6 parts by mass) serving as the polymerization initiator were stirred to prepare foaming accelerator-containing ink D.

The functional group equivalent in the foaming accelerator of foaming accelerator-containing ink D was found to be 226 g/eq.

Comparative Example 2

The same procedure as in Example 1 was performed except that the foaming accelerator of Example 1 was not used and only the coating liquid was used.

Next, each of the obtained foamed bodies of Examples 1 to 3 and Comparative Example 1 was evaluated in the following manners in terms of a design property attributable to a bossed-recessed shape and durability of image quality. Results are presented in Table 1.

<Design Property Attributable to Bossed-Recessed Shape>

A surface of the obtained foamed body was visually observed and evaluated according to the following evaluation criteria.

[Evaluation Criteria]
A: A bossed-recessed shape was visually observable.
B: A bossed-recessed shape was not visually observable.

<Durability of Image Quality>

According to JIS K5600-5-4 (ISO/DIN 15184), the obtained foamed body was subjected to a pencil hardness test. The test was performed on a portion to which the foaming accelerator-containing ink was not discharged and on a portion to which the foaming accelerator-containing ink was discharged.

TABLE 1

| | Evaluation of durability (Pencil hardness test) | | |
|---|---|---|---|
| | Portion to which the foaming accelerator-containing ink was not discharged | Portion to which the foaming accelerator-containing ink was discharged | Design property |
| Ex. 1 | 3H | 2H | A: Bossed-recessed shape was visually observable |
| Ex. 2 | 3H | 2H | A: Bossed-recessed shape was visually observable |
| Ex. 3 | 3H | 2H | A: Bossed-recessed shape was visually observable |
| Comp. Ex. 1 | 3H | 3H | B: Bossed-recessed shape was not visually observable. |
| Comp. Ex. 2 | — | 3H | B: Bossed-recessed shape was absent because foaming could not occur over the entire surface. |

Aspects of the present disclosure are as follows, for example.

<1> A method for producing a foamed body, the method comprising:
  forming a foamed layer precursor, including:
    applying a coating liquid onto a base to form a liquid film, the coating liquid containing a foaming agent and an active energy ray curable material having a radical-polymerizable functional group, the active energy ray curable material containing a multifunctional active energy ray curable material having two or more radical-polymerizable functional groups; and
    applying an ink onto the liquid film by an inkjet method, the ink containing a foaming accelerator having a radical-polymerizable functional group; and
  foaming a desired position of the foamed layer precursor by heating to form a foamed layer,
  wherein a functional group equivalent of the radical-polymerizable functional group in the foaming accelerator is greater than a functional group equivalent of the radical-polymerizable functional group in the active energy ray curable material.

<2> The method according to <1>,
  wherein the forming the foamed layer precursor further includes curing the liquid film and the ink with active energy rays, and
  wherein the method further includes forming an image, between the forming the foamed layer precursor and the foaming, the forming the image, including:
    applying another ink onto the foamed layer precursor to form an ink layer, said another ink containing an active energy ray curable material and a colorant; and
    curing the ink layer with active energy rays.

<3> A method for producing a foamed body, the method comprising:
  forming a foamed layer precursor, including:
    applying a coating liquid onto a base to form a liquid film, the coating liquid containing a foaming agent and a multifunctional active energy ray curable material having two or more radical-polymerizable functional groups;
    applying an ink onto the liquid film by an inkjet method, the ink containing a monofunctional foaming accelerator having one radical-polymerizable functional group; and
    curing the liquid film and the ink with active energy rays;
  forming an image, including:
    applying another ink onto the foamed layer precursor to form an ink layer, said another ink containing an active energy ray curable material and a colorant; and
    curing the ink layer with active energy rays; and
  foaming a desired position of the foamed layer precursor by heating to form a foamed layer.

<4> The method according to any one of <1> to <3>, wherein the foaming agent is a thermally expansible microcapsule.

<5> A device (100) for producing a foamed body, the device comprising:
  a foamed layer precursor forming unit (11; 12) containing:
    a coating liquid containing a foaming agent and an active energy ray curable material having a radical-polymerizable functional group, the active energy ray curable material containing a multifunctional active energy ray curable material having two or more radical-polymerizable functional groups; and
    an ink containing a foaming accelerator having a radical-polymerizable functional group,
  the foamed layer precursor forming unit (11; 12) configured to apply the coating liquid onto a base (10) to form a liquid film and apply the ink onto the liquid film by an inkjet method to form a foamed layer precursor; and a foamed layer forming unit (20) configured to foam a desired position of the foamed layer precursor by heating to form a foamed layer, wherein a functional group equivalent of the radical-polymerizable functional group in the foaming accelerator is greater than a functional group equivalent of the radical-polymerizable functional group in the active energy ray curable material.

<6> The device (100) according to <5>, wherein the foamed layer precursor forming unit (11; 12) further includes a curing unit (13a) configured to cure the liquid film and the ink with active energy rays, and wherein the device (100) further includes an image forming unit (15; 16; 17; 18; 19; 13b) containing another ink containing an active energy ray curable material and a colorant, the image forming unit (15; 16; 17; 18; 19; 13b) configured to apply said another ink onto the foamed layer precursor to form an ink layer and cure the ink layer with active energy rays to form an image.

<7> A device (100) for producing a foamed body, the device comprising:

a foamed layer precursor forming unit (11; 12; 13a) containing:

a coating liquid containing a foaming agent and a multifunctional active energy ray curable material having two or more radical-polymerizable functional groups; and an ink containing a monofunctional foaming accelerator having one radical-polymerizable functional group, the foamed layer precursor forming unit (11; 12; 13a) configured to apply the coating liquid onto a base (10) to form a liquid film, apply the ink onto the liquid film by an inkjet method, and cure the liquid film and the ink with active energy rays to form a foamed layer precursor;

an image forming unit (15; 16; 17; 18; 19; 13b) containing another ink containing an active energy ray curable material and a colorant, the image forming unit (15; 16; 17; 18; 19; 13b) configured to apply said another ink onto the foamed layer precursor to form an ink layer and cure the ink layer with active energy rays to form an image; and a foamed layer forming unit (20) configured to foam a desired position of the foamed layer precursor by heating to form a foamed layer.

<8> The device (100) according to any one of <5> to <7>, wherein the foaming agent is a thermally expansible microcapsule.

The method according to any one of <1> to <4> above and the device according to any one of <5> to <8> can solve the problems in the art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A method for producing a foamed body, the method comprising:

forming a foamed layer precursor, including:

applying a coating liquid onto a base to form a liquid film, the coating liquid containing a foaming agent and an active energy ray curable material having a radical-polymerizable functional group, the active energy ray curable material containing a multifunctional active energy ray curable material having two or more radical-polymerizable functional groups; and applying an ink onto the liquid film by an inkjet method, the ink containing a foaming accelerator having a radical-polymerizable functional group; and foaming a desired position of the foamed layer precursor by heating to form a foamed layer.

2. A method for producing a foamed body, the method comprising:

forming a foamed layer precursor, including:

applying a coating liquid onto a base to form a liquid film, the coating liquid containing a foaming agent and a multifunctional active energy ray curable material having two or more radical-polymerizable functional groups;

applying an ink onto the liquid film by an inkjet method, the ink containing a monofunctional foaming accelerator having one radical-polymerizable functional group; and curing the liquid film and the ink with active energy rays;

forming an image, including:

applying another ink onto the foamed layer precursor to form an ink layer, said another ink containing an active energy ray curable material and a colorant; and curing the ink layer with active energy rays; and foaming a desired position of the foamed layer precursor by heating to form a foamed layer.

3. The method according to claim 1, wherein the foaming agent is a thermally expansible microcapsule.

4. The method according to claim 1, wherein a content of the multifunctional monomer in the coating liquid is 40% by mass or more but 90% by mass or less.

* * * * *